Feb. 10, 1942.   R. B. LEWIS   2,272,993
HARDNESS TESTING MACHINE
Filed Sept. 13, 1939   2 Sheets-Sheet 1

INVENTOR.
Robert B. Lewis
BY
Herbert S. Fairbanks
ATTORNEYS.

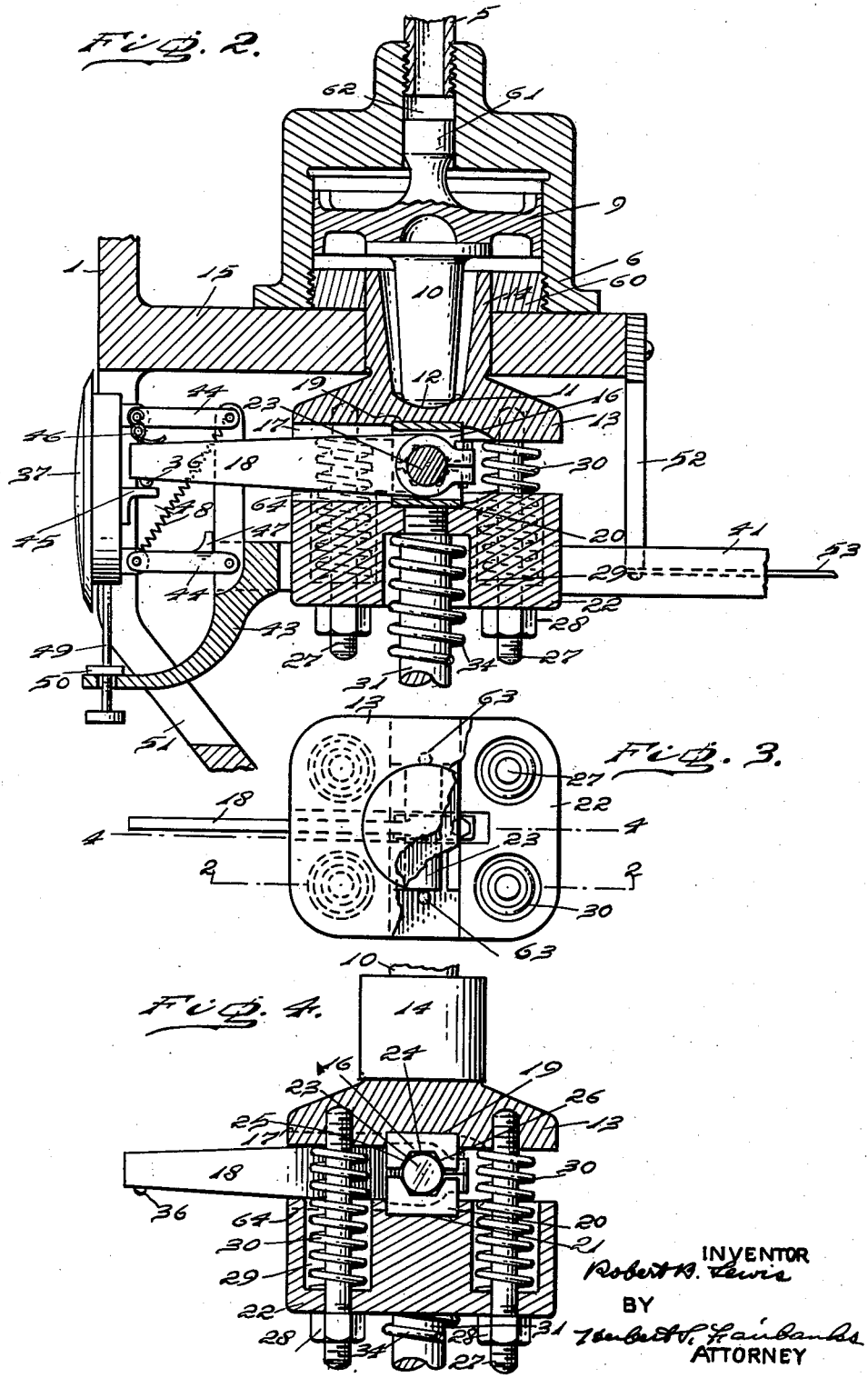

Patented Feb. 10, 1942

2,272,993

UNITED STATES PATENT OFFICE 2,272,993

HARDNESS TESTING MACHINE

Robert B. Lewis, Philadelphia, Pa., assignor to Tinius Olsen Testing Machine Company, Philadelphia, Pa., a corporation of Pennsylvania Application September 13, 1939, Serial No. 294,580

7 Claims. (Cl. 265—12)

In testing the hardness of a test piece, it is desirable, in order to obtain a correct indication of the internal structure, to have the penetrator or test ball initially penetrate the surface of the test piece, and, thereafter a major portion of the test load is applied to the penetrator to effect the penetration of the internal structure of the test piece.

The object of this invention is to devise a novel and simplified construction whereby the minor portion of the load can be applied without actuating the penetration indicator, and whereby the penetration indicator will operate only during the application of the major portion of the load.

To this end, I provide an actuating arm or member which is floating relatively to the penetration indicator during the application of the minor portion of the load and which has one end clamped to move in unison with the movement of the penetrator during the application of the major portion of the load. The operative connection from the piston to the penetrator is of such a character that juxtaposed spaced portions carry clamping members with springs of a desired capacity between such members, so that the clamping members will be effective to clamp the arm for operation of the penetration indicator only after the minor portion of the load has been applied to the penetrator and the surface of the test piece has been penetrated.

With the above and other objects in view as will hereinafter more clearly appear, my invention comprehends a novel hardness testing machine, and more particularly a novel construction for causing the penetration indicator to operate only during the application of the major portion of the load to the penetrator and test piece.

Other novel features of construction and advantage will hereinafter more clearly appear in the detailed description and the appended claims.

For the purpose of illustrating the invention, I have shown in the accompanying drawings a typical embodiment of it, which, in practice, will give reliable and satisfactory results. It is, however, to be understood that this embodiment is typical only and that the various instrumentalities of which my invention consists can be variously arranged and organized, and the invention is not limited to the precise arrangement and organization of these instrumentalities as herein set forth.

Figure 2 is a section on line 2—2 of Figure 3.

Figure 3 is a top plan view of the spring guide partly broken away.

Figure 4 is a section on line 4—4 of Figure 3.

Similar numerals indicate corresponding parts.

Figures 1, 5:
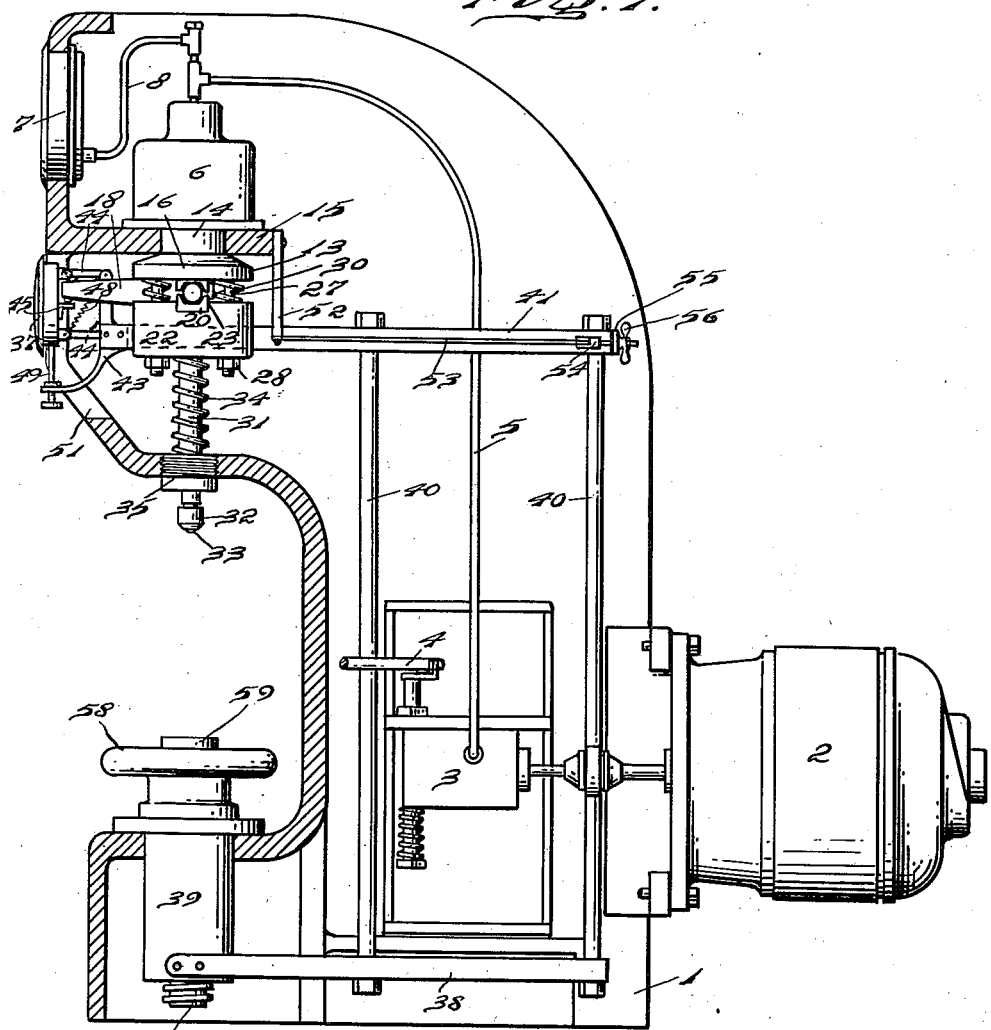
Figure 1 is a sectional elevation of a testing machine embodying my invention.
Figure 5 is a top plan view of a support for the penetration indicator.

Referring to the drawings:

1 designates the casing or housing of a testing machine embodying my invention. The casing carries an electric motor 2, which drives a pump 3, the flow from which is controlled by a handle 4 and having a pressure line 5 to a pressure cylinder 6. The pressure is indicated on a load indicator 7 having a line 8 in communication with the pressure line 5. A piston 9 in the pressure cylinder has a depending, tapered, pressure transmitting member 10, rounded at its bottom, as at 11, to contact the rounded bottom wall 12 of a clamp block guide 13, the recessed stem 14 of which is movable in a shelf 15 connected with the housing. 16 is an upper clamp block.

The bottom wall of the clamp block guide 13 is slotted as at 17 to provide for movement of an arm or member 18. The rear end of this arm may be integral but as shown consists of a cylindrical member or rod clamped in the bifurcated rear end of the arm.

The clamp block guide 13 is cut out, as at 19, to receive the upper clamp block 16.

A lower clamp block 20 is seated in a recess 21 in a spring support 22 and is positioned in the same manner that the upper clamp block is centered to the clamp block guide 13. The arm 18 has its rod or bearing member 23 between the clamp blocks, each of which is recessed to provide a flat wall 24 and outwardly diverging walls 25 and 26, which contact the bearing member.

Spring studs 27 pass through the spring support 22, and, at their upper ends are in threaded engagement with the clamp block guide 13, while their lower ends are provided with nuts 28. The spring support 22 has recesses 29 to receive the studs 27 and springs 30 which encircle the studs.

A supporting stem 31 is in threaded engagement, at its upper end, with the spring support, and the penetrator support 32 which carries the penetrator 33, such as for example a ball, is secured to the lower end of the supporting stem 31.

The spring support is recessed to receive a counter-balancing spring 34 interposed between it and the housing, which latter is provided with a guide bearing 35 for the support stem 31, and used to return the piston to starting position.

The forward end of the arm 18 carries a ball contact point 36 which actuates a penetration indicator 37, of any desired or conventional type having a dial and a spring pressed pointer.

The penetration indicator 37 is carried by a special support separate from the housing, consisting of two lower spaced bars 38, secured at their forward ends to the anvil supporting sleeve 39, and each having spaced uprights 40, connected at their upper ends to two spaced upper bars 41, braced by a rectangular frame 42. The forward ends of the bars 41 are fixed to a bracket 43 to which two parallel links 44 are pivoted, the opposite ends of such links being pivoted to the casing of the penetration indicator 37, which carries an abutment 45 with which the ball 36 is maintained in contact by a spring 46. The lower link 44 has a stop 47 and a spring 48 connecting the front pivot of the lower link and the rear pivot of the upper link tends to retain the stop 47 against the bracket 43. The penetration indicator has a pointer setting stem 49 passing through a lower deflected arm of the bracket 43 and provided above the bracket with a nut 50 to limit downward movement of the stem.

The housing 1 has an opening 51 to provide proper clearance for the penetration indicator 37 and the bracket 43.

The shelf 15 of the housing has a plate 52 secured to it and to this plate the front ends of flexing strips 53 are secured. The rear ends of the strips 53 are secured to threaded connections 54 which pass through a bar 55 secured to the frame 42, and are provided with thumb nuts 56.

A screw 57 in the sleeve 39 is adjusted by a hand wheel 58 to position an anvil or test piece support 59 which is in axial alignment with the penetrator 33.

The pressure cylinder 6 is secured to the shelf 15 in any desired manner and its lower end is closed by a threaded bottom 60 which is apertured to receive and guide the stem 14 of the clamp block guide 13.

The piston 9 has a head 61 of reduced diameter in a bore 62 of the cylinder 6.

The bearing member 23 is preferably positioned by pins 63, see Figure 3.

The clamp block guide and the spring support are recessed to provide proper clearance for the movement of the arm 18 as will be clear from Figures 2 and 4, the clamp block guide having the slot 17 and the spring support having a slot 64.

The operation will now be apparent to those skilled in this art and is as follows:

Assuming that the specimen to be tested has been placed on the specimen support 59 and the latter adjusted to the proper height, the load is applied to the piston 9 and is transmitted through the clamp block guide 13, springs 30, spring support 22 and stem 31 to the penetrator 33 causing it to penetrate the outer surface of the specimen. During this initial operation, the operating arm 18 of the penetration indicator 37 is not clamped by the clamp blocks 16 and 20, and, therefore the penetration indicator does not indicate.

The load builds up to apply the major portion of the load to the penetrator, compressing the springs 30, and causing the clamping blocks to grip the rod 23 of the arm 18, so that said arm 18 moves downwardly in unison with the penetrator, thereby actuating the penetration indicator.

It will thus be clear that the penetration indicator operates only during the application of the major portion of the load, and gives a proportional indication of the internal structure of the test specimen.

The arm for operating the penetration indicator is floating during the application of the minor portion of the load and is clamped at one end to move in unison with the penetrator only during the application of the major portion of the load.

Having thus described my invention, what I claim as new and desire to secure by Letters Patent is:

1. In a hardness testing machine, a specimen support, a penerator, a penetration indicator and its actuating member, a clamp block guide, a spring support connected with the penetrator, clamp blocks carried by said clamp block guide and said spring support to clamp or release said actuating member, springs acting to prevent the clamp blocks from clamping said arm during the application of a minor portion of the load and to permit the clamp blocks to clamp said arm during the application of the major or final portion of the load, and means to apply a load to said clamp block guide.

2. In a hardness testing machine, a specimen support, a penetration indicator having an actuating arm normally floating, a hydraulic piston, a clamp block guide moved by said piston, a spring support, clamp blocks to clamp an end of said arm to render it effective to actuate the penetration indicator, and carried by said clamp block guide and said spring support, springs interposed between said clamp block guide and said spring support, a penetrator, a stem connecting said spring support and said penetrator, and means to load said piston.

3. In a hardness testing machine, a specimen support, a penetration indicator having an actuating arm normally floating, a hydraulic piston having a projecting stem, a clamp block guide having a recess of greater area than said stem and into which the latter extends to apply load to said clamp block guide, a spring support having limited relative movement with said clamp block guide, clamping blocks carried by said guide and spring support to clamp or release said arm, springs between said guide and spring support, a penetrator carried by said spring support, and means to load said piston.

4. In a hardness testing machine, a housing, a penetrator, a penetration indicator mounted in the housing, an anvil in axial alignment with the penetrator, a support separate from the housing, a linkage arrangement connecting said indicator with said support, an arm normally floating and having an anti-friction member contacting said indicator, a spring to maintain such contact, clamping members for said arm, one of said clamping members being connected to said penetrator, yielding means to release the clamping action of said members during the application of the minor part of a load to the penetrator and to permit the clamping action during the application of the major part of a load to the penetrator, and means to load the other of said clamping members.

5. In a hardness testing machine, a housing, a penetration indicator mounted in the housing, a penetrator, an anvil in axial alignment with the penetrator, a support separate from the housing, a linkage arrangement connecting said indicator with said support, yielding means tending to retain said linkage arrangement in its normal position, an arm normally floating and having an anti-friction member contacting said indicator, a spring to maintain such contact, clamping members for said arm, one of said clamping members being connected to said penetrator, yielding means to release the clamping action of said members during the application of the minor part of a load to the penetrator and to permit the clamping action during the application of the major part of a load to the penetrator, and means to load the other of said clamping members.

6. In a hardness testing machine, a housing, a specimen support carried by the housing, a penetrator, a hydraulic cylinder having a piston effective to load the penetrator, a penetration indicator having a support separate from the housing, clamping members one above the other controlled by the pressure of said cylinder and connected and interposed between the piston and penetrator, a laterally extending arm between and having a clearance with the clamping members and having at one end a rod clamped or released by said clamping members and operatively connected to said penetration indicator to actuate it when such rod is clamped, springs between said clamping members to release their clamping action during surface penetration of the specimen and to permit clamping action when the hydraulic load increases above that of the springs, and a counterbalancing spring for said piston.

7. In a hardness testing machine, a specimen support, a penetration indicator having a laterally extending arm with a rod fixed to one end of the arm, vertically spaced clamping members between which said rod and said arm extend, with said arm having a clearance with said members, said members being adapted to clamp said rod, resilient means tending to retain said members in unclamped position, a penetrator operatively connected with one of said members, and means to apply a load on the upper clamping member whereby a minor portion of the load is applied to said penetrator through said one of said clamping members and said resilient means without clamping said rod and a major or final portion of the load to said penetrator is applied through said clamping members and rod, whereby the penetration indicator will register only after surface penetration of said specimen has been effected and only during the application of the major or final portion of the load to the penetrator.

ROBERT B. LEWIS.